United States Patent
Parette

(10) Patent No.: US 7,637,713 B1
(45) Date of Patent: Dec. 29, 2009

(54) APPARATUS AND METHOD FOR SEPARATING TOPMOST DISC-LIKE OBJECT FROM A STACK

(75) Inventor: Michael S. Parette, Peckville, PA (US)

(73) Assignee: Cinram International Inc., Scarborough, Ontario ( * ) Notice: Subject to any disclaimer, the term of this patent is extended or adjusted under 35 U.S.C. 154(b) by 242 days.

(21) Appl. No.: 11/705,682

(22) Filed: Feb. 13, 2007

(51) Int. Cl.
*B65G 59/00* (2006.01)
*B65H 3/14* (2006.01)

(52) U.S. Cl. ..................... 414/795.5; 271/98; 414/797

(58) Field of Classification Search ............. 211/41.12; 221/278; 271/20, 3.05, 3.11, 97–98; 294/64.3; 414/795.5
See application file for complete search history.

(56) References Cited

U.S. PATENT DOCUMENTS

| | | | | |
|---|---|---|---|---|
| 4,029,351 A | * | 6/1977 | Apgar et al. | 294/64.3 |
| 4,625,953 A | * | 12/1986 | Hamatani | 271/1 |
| 5,073,037 A | | 12/1991 | Fujikawa et al. | |
| 5,077,888 A | * | 1/1992 | Tokisue et al. | 29/467 |
| 5,528,577 A | * | 6/1996 | Maenza | 369/53.27 |
| 5,549,444 A | | 8/1996 | Dubuit | |
| 5,722,811 A | * | 3/1998 | Schum et al. | 414/796 |
| 5,801,464 A | | 9/1998 | Brezoczky | |
| 5,946,216 A | | 8/1999 | Hollerich | |
| 6,111,847 A | | 8/2000 | Asadian | |
| 6,151,189 A | | 11/2000 | Brooks | |
| 6,222,800 B1 | | 4/2001 | Miller et al. | |
| 6,290,096 B1 | * | 9/2001 | Spina et al. | 221/278 |
| 6,321,649 B1 | | 11/2001 | Vangen et al. | |
| 6,355,896 B1 | | 3/2002 | Cresgy | |
| 6,416,609 B1 | | 7/2002 | Imada et al. | |
| 6,537,423 B1 | | 3/2003 | Ebisawa et al. | |
| 6,636,462 B1 | | 10/2003 | Drynkin et al. | |
| 6,820,325 B2 | | 11/2004 | Gieskes et al. | |
| 7,092,320 B1 | | 8/2006 | Lee et al. | |
| 2002/0009022 A1 | | 1/2002 | Britz et al. | |
| 2003/0002400 A1 | | 1/2003 | Klein | |
| 2006/0023598 A1 | | 2/2006 | Babinski et al. | |
| 2006/0101634 A1 | | 5/2006 | Sweeney | |
| 2006/0104190 A1 | | 5/2006 | Babinski | |
| 2006/0165419 A1 | | 7/2006 | Musto | |
| 2006/0181706 A1 | | 8/2006 | Sweeney | |
| 2006/0222808 A1 | | 10/2006 | Pickutoski et al. | |
| 2006/0270080 A1 | | 11/2006 | Rinaldi | |
| 2006/0274617 A1 | | 12/2006 | Musto et al. | |
| 2007/0008861 A1 | | 1/2007 | Fumanti | |
| 2007/0014224 A1 | | 1/2007 | Sweeney | |
| 2007/0029167 A1 | | 2/2007 | Kelsch | |
| 2007/0090006 A1 | | 4/2007 | Kelsch | |
| 2007/0098947 A1 | | 5/2007 | Mueller | |

FOREIGN PATENT DOCUMENTS

JP 2003168271 A * 6/2003

OTHER PUBLICATIONS

U.S. Appl. No. 11/715,249, filed Mar. 6, 2007.
U.S. Appl. No. 11/726,968, filed Mar. 22, 2007.

* cited by examiner

*Primary Examiner*—Gregory W Adams
(74) *Attorney, Agent, or Firm*—Cooper & Dunham, LLP

(57) ABSTRACT

Apparatuses and methods for facilitating the separation and retrieval of a topmost disc stored in a vertical stack of similar discs, with minimal modification to existing production lines, are provided. A disc stacking apparatus configured to allow flow of preferably ionized air through an air channel within a spindle shaft and out through one or more air ports is also provided.

17 Claims, 5 Drawing Sheets

APPARATUS AND METHOD FOR SEPARATING TOPMOST DISC-LIKE OBJECT FROM A STACK

TECHNICAL FIELD

The present disclosure relates to an apparatus for facilitating the separation of a topmost disc-like object on a vertical stack of similar objects.

BACKGROUND

Many disc-like objects such as CDs (compact discs), DVDs (digital versatile discs or digital video discs), HD-DVDs (high definition DVDs), BDs (Blu-ray discs), etc., have center holes and are mass produced along a production line that involves processes which require retrieval of the topmost such object from a vertical stack of similar objects. Such production processes include, for example, printing or otherwise applying text and/or graphics on unfinished discs, inserting a finished disc in a carrier case or other packaging, etc.

As the discs are transported from one process to another, they are typically transported in a vertical stack, such as on a spindle that penetrates the center holes of the discs.

The topmost disc is removed from the stack by a handling device or mechanism that can include a robotic arm and a device referred to in the art as a "picker". The robotic arm positions the picker which engages the disc. The robotic arm then moves the engaged disc from the stack to a desired location on the production line where the picker then releases the disc. Some conventional pickers generally employ vacuum or suction from above the topmost disc to retrieve that disc from the spindle stack. Other conventional pickers mechanically grasp the topmost disc along the outer edge of the object and/or the inner edge bordering the center hole of the disc.

In many conventional production systems, the handling device is accompanied by a movable disc carrier platform (not shown) including a center hole through which the spindle fits. After a disc is removed from the spindle, the stack of discs is elevated a distance equal to the thickness of the disc, so that the topmost disc in the stack is at a predetermined position relative to the stack.

A problem that exists with many conventional handling devices, such as mentioned above, is the unintended retrieval of multiple discs from the stack in a particular handling cycle. This problem leads to downtime in the manufacturing process and often requires operator intervention, thus increasing production cost.

The causes of this problem include buildup of static charge on the discs, moisture between contacting surfaces of adjacent discs, and/or the formation of a vacuum between adjacent discs.

A variety of approaches for separating the topmost disc from other discs in a stack have been proposed. For example, a compact disc gripper device has been proposed for gripping a topmost CD off a vertical stack of CDs. Other approaches have proposed adding spacers between adjacent discs in a stack. Another approach proposes blowing ionized air from the outer side face of the stack.

The above mentioned prior arts suffer from several disadvantages. For example, the gripping mechanisms described above require the replacement of current disc handling mechanisms at multiple sites along each production line, thereby injecting additional complexity and cost to the manufacturing process. The spacers described above minimize the number of discs that can be accommodated on a stack of a predetermined height and also require additional means for inserting and removing the spacers. The application of ionized air to the outer side face of the stack has been shown not to work effectively.

Consequently, there exists a need for improved techniques for separating a topmost disc from a stack of discs.

SUMMARY

The present disclosure describes improved apparatuses and methodologies which can be applied successfully to separate a topmost disc from a stack.

In one aspect, an improved spindle facilitates the separation and retrieval of individual discs from a vertical stack of discs. Such a spindle includes an air channel within the spindle shaft, and one or more air ports. The air ports are located near the top end of the air channel. An air source supplies air through the air channel to the top end of the air channel, and the supplied air exits the spindle shaft through the air ports.

In another aspect, the present disclosure provides an apparatus for facilitating the separation and retrieval of optical recording discs. The apparatus includes the above mentioned spindle, an air supply, at least one valve for controlling the flow of air through the air ports of the spindle, and a controller with means to actuate the one or more valves to control the flow of air through said air ports. The air supplied through the air ports is preferably ionized such that the static charge between the discs can be neutralized. In addition, the pressure of the air flow through the air ports in a radially outwardly direction overcomes the naturally adhesive tendencies of adjacently stacked discs. The vertical positioning of the discs and the timing of the application of the air flow are controlled such that the topmost disc is separated from the disc immediately below at an optimal timing, thereby enabling high speed handling.

Other objects, features, and advantages of the present disclosure will become apparent from the following detailed description when read in conjunction with the accompanying drawings.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompany drawings, wherein.

DETAILED DESCRIPTION

The following discussion of exemplary embodiments is set forth to aid in an understanding of the subject matter of this disclosure, but is not intended, and should not be construed, to limit in any way the scope of this disclosure. Therefore, while specific terminology is employed for the sake of clarity in describing some exemplary embodiments, the present disclosure is not intended to be limited to the specific terminology so selected, and it is to be understood that each specific element includes all technical equivalents thereof.

This disclosure describes techniques for effectively separating a topmost disc from a stack of discs, without requiring manufacturers to replace their current disc handling mechanisms at multiple production stations along each production line. Thus, existing production lines, with minimal modification, can be improved to reduce incidents of unintended retrieval of multiple discs from the stack in a particular handling cycle.

Figure 1:
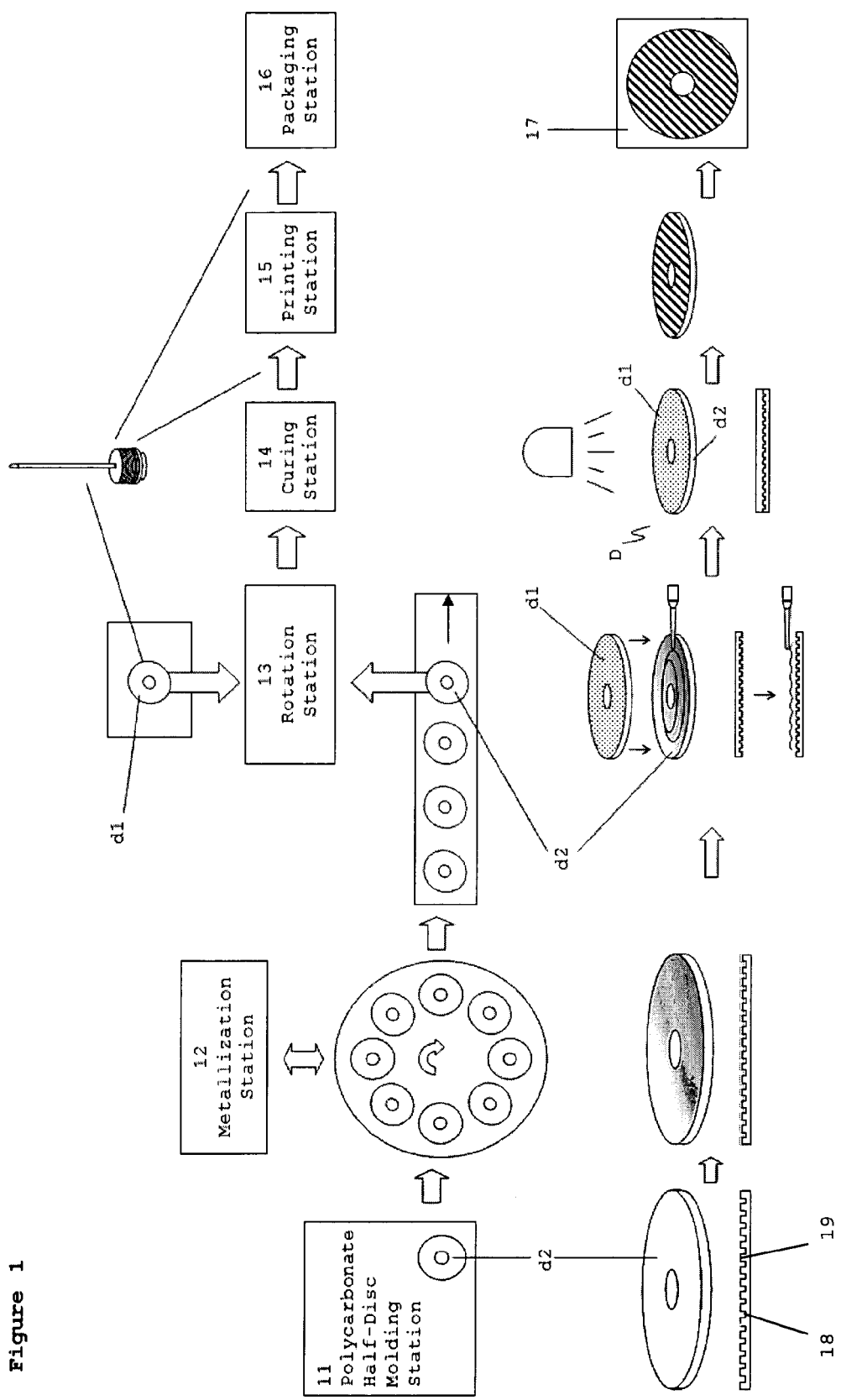
FIG. 1 illustrates an in-line production system for producing double-surfaced optical discs.

An in-line production system for producing double-surfaced optical discs (such as DVD or HD disc) will be described with reference to FIG. 1. This system can include a printing station for applying text and/or graphics on unfinished discs and will be described in further detail below with reference to FIG. 2.

Each double-surfaced optical disc has an upper surface (which may be information bearing or not) and a lower information bearing surface and with each information bearing surface being formed by injection molding 11 a polycarbonate plastic half disc having a pattern of pits 18 and lands 19 and by coating the pits 18 and lands 19 with a metallic reflective coating.

A molded plastic lower half disc d2 is placed by a robotic arm in a carousel which rotates to bring the lower half disc d2 to the metallization station 12 where the half disc d2 is lifted by a robotic arm and brought into the metallization station 12, coated upon the pitted surface with a reflective metal layer and returned to the carousel. The lower half disc d2 travels upon transport belts to a corresponding upper half disc d1 waiting upon a spindle 18 for assembly. The lower half disc d2 is moved by a robotic arm from the transport belt to a rotation station 13 where a fluid dispensing arm places ultra-violet curable adhesive on the lower half disc d2. A robotic arm then removes the upper half disc d1 from the spindle 18 and places it in contact with the adhesive on the lower half disc d2. The sandwich of discs and adhesive is rapidly spun to spread the adhesive.

The composite D is then transported along the transport belt to a curing station 14 where the composite is exposed to sufficient ultra-violet light to cure the adhesive.

The composite discs D are then stored and transported on a spindle 18 to a printing station 15 where discs D are removed from the spindle 18 and loaded on to the printer for an application of text and/or graphics to the surface of each composite disc D.

The composite discs D can then transported on a spindle 18 to a packaging station 16 where each disc is again removed from the spindle and inserted in a carrier case 17 or other packaging.

Figure 2:
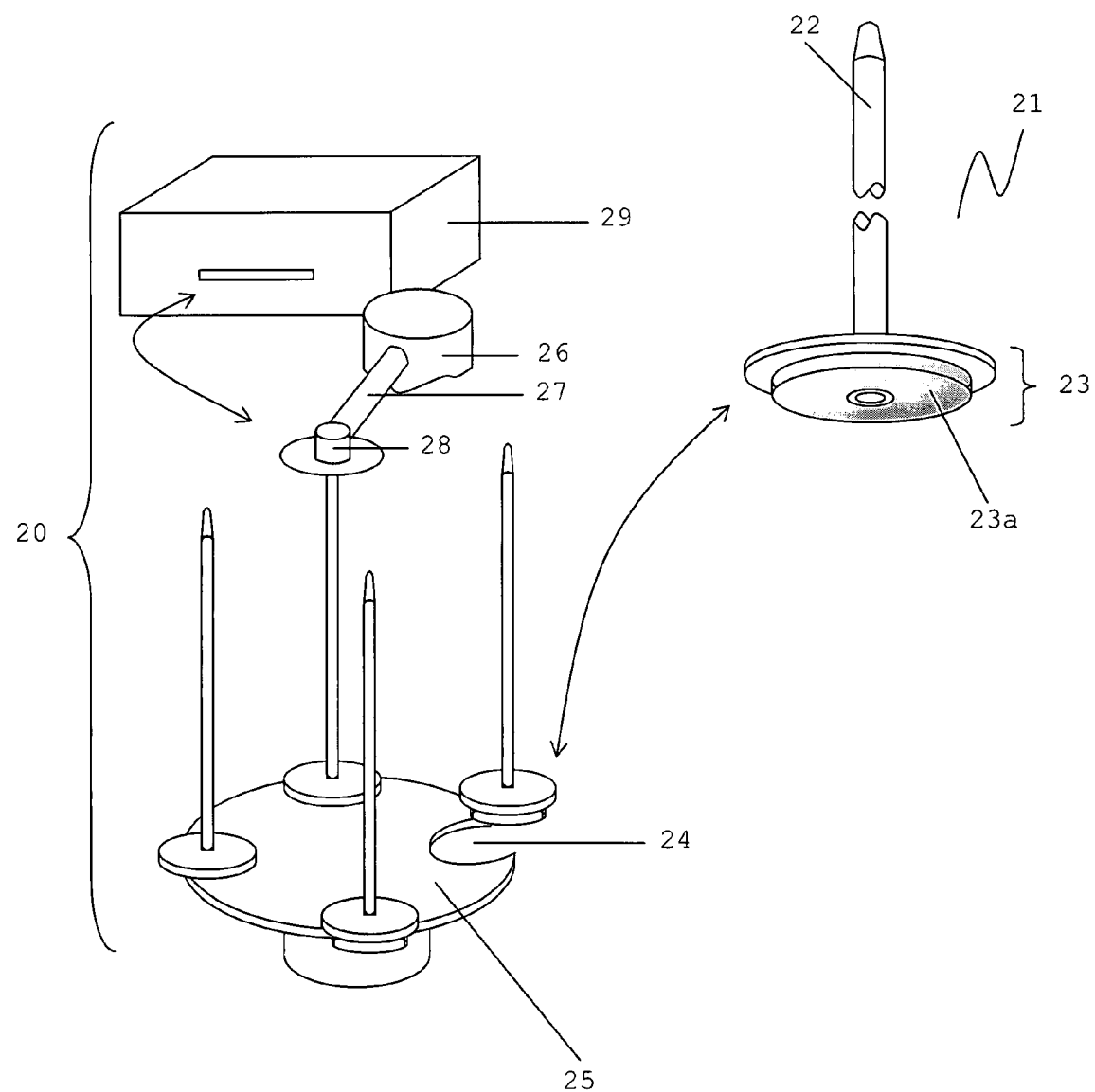
FIG. 2 illustrates a printing station in a production system for producing optical discs.

The printing station 20 in FIG. 2 can accommodate multiple spindle stacks of unfinished discs. Unfinished discs are stored on removable spindles 21 each having a spindle shaft 22 attached at its lower end to a spindle base 23. The spindle base 23 can have a lower portion 23a with a diameter slightly smaller than the diameter of a mounting hole 24 on a rotating printing station platform 25. A spindle 21 can then be removably mounted into a corresponding mounting hole 24 on the printing station platform 25.

At the printing station 20, a handling device 26 having a robotic arm 27 and a picker 28 can then be used to transfer individual unfinished discs from the spindle stack to the printer 29. The picker 28 can be any device that removes one or more discs from the top of a stack of similar discs, for example, a vacuum device or a gripping device. In a particular handling cycle, a robotic arm 27 can first be lowered vertically so that a picker 28 can engage a topmost disc. The robotic arm 27 can then be raised and rotated to the printer 29 where the picker 28 releases the disc to the printer 29.

The handling device (not picture) can also include a movable disc carrier platform. After a disc is removed from the spindle 21, the stack of discs is elevated a distance equal to the thickness of the disc, so that the topmost disc in the stack is at a predetermined position relative to the stack.

As should be apparent after reading this disclosure in its entirety, the above mentioned system is merely one conventional system amongst many conventional systems which can be modified according to the present disclosure.

Existing disc-handling production lines and stations, such as the printing station described above, can be modified to utilize a disc stacking apparatus to hold a stack of discs and to facilitate the separation and retrieval of a topmost disc from the stack. A disc stacking apparatus according to an exemplary embodiment of this disclosure will be discussed below with reference to FIG. 3 (which is not drawn to scale).

The disc stacking apparatus 30 includes a spindle shaft 31 coupled to a base 32. The spindle shaft 31 has an air channel 33 having a first end 33a closer to the base 32 and a second end 33b further away from the base 32. In addition, the disc stacking apparatus 30 also has one or more air ports 34 located towards the second end 33b of the air channel 33. Each of the one or more air ports 34 extends from the air channel 33 to the exterior surface 31a of the spindle shaft 31 and the air ports 34 can extend in a direction perpendicular to a vertical axis of the spindle shaft 31.

The disclosed apparatus 30 can be further configured in such a way that air supplied by an air source (not shown) through the first end 33a of the air channel 33 flows through the air channel 33 and is directed out the one or more air ports 34 located towards the second end 33b of the air channel 33. The air can exit the one or more air ports 34 in a direction that is parallel to the bottom surface of the topmost disc in the stack and radially outward relative to the center hole of the disc.

The disclosed apparatus 30 can be mechanically connected to disc-handling production stations like those described above. The disclosed apparatus 30 is further configured for stacking disk-like objects with a center hole. Disk-like objects that are stacked in such fashion include optical recording discs such as CDs, DVDs, HD-DVDs, BDs, etc. Such discs have a center hole having a diameter slightly larger than the outer diameter of the spindle shaft 31, to enable the spindle shaft 31 to penetrate through the center hole.

Figure 3:
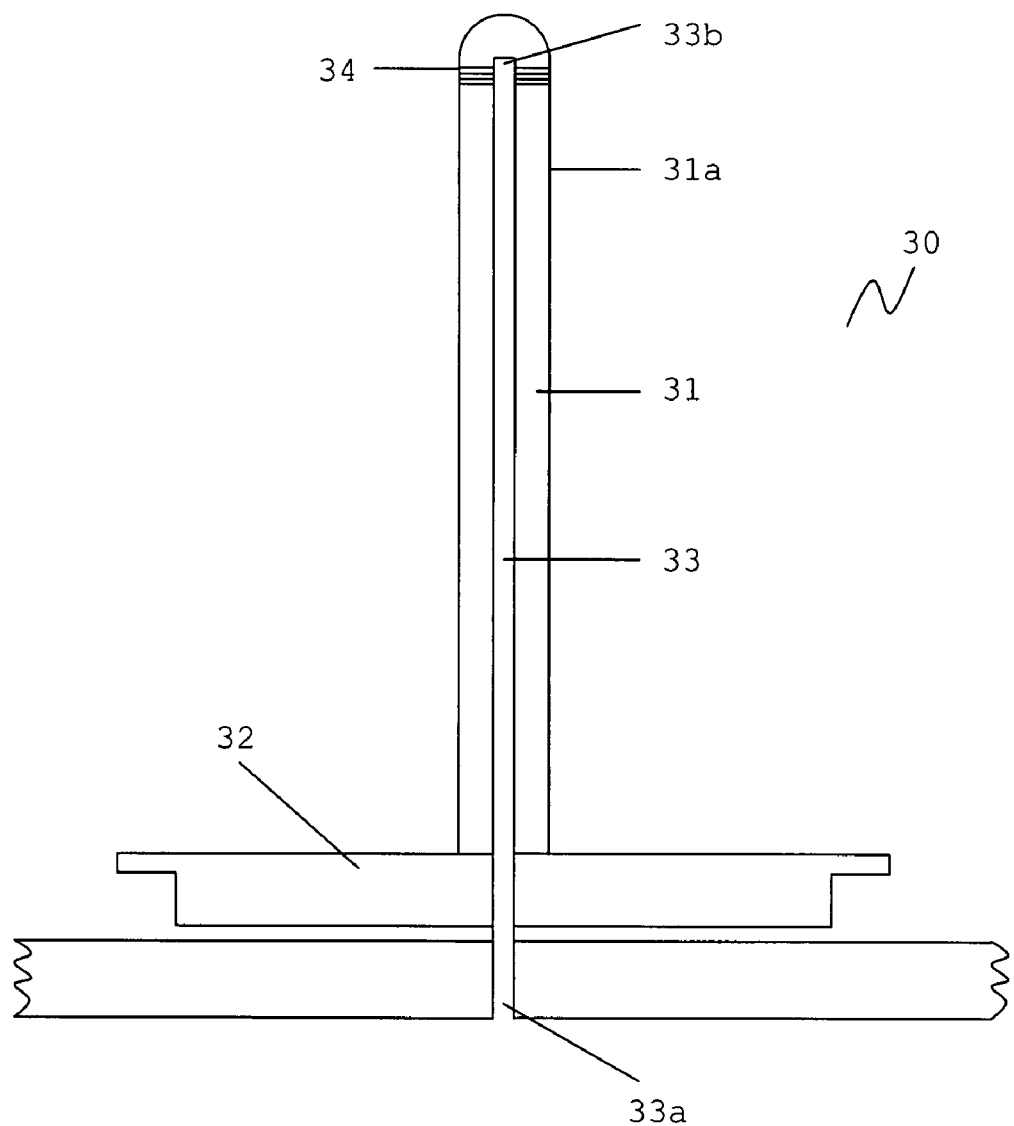
FIG. 3 is a cross-sectional view of a disc stacking apparatus of the present disclosure.

The disc-stacking apparatus of FIG. 3 can further include air that is ionized and supplied through the one or more air ports 34, at or above a pressure, when exiting the one or more air ports 34, that overcomes any adhesion between the topmost disc and the adjacent disc in the stack.

The disc-stacking apparatus 30 described is preferably configured to accommodate ionized air exiting the air ports 34 and delivered at such a pressure that either the ionized air and/or the air pressure is adequate to overcome adhesion and/or static properties between the topmost disc and the disc immediately below.

Figure 4:
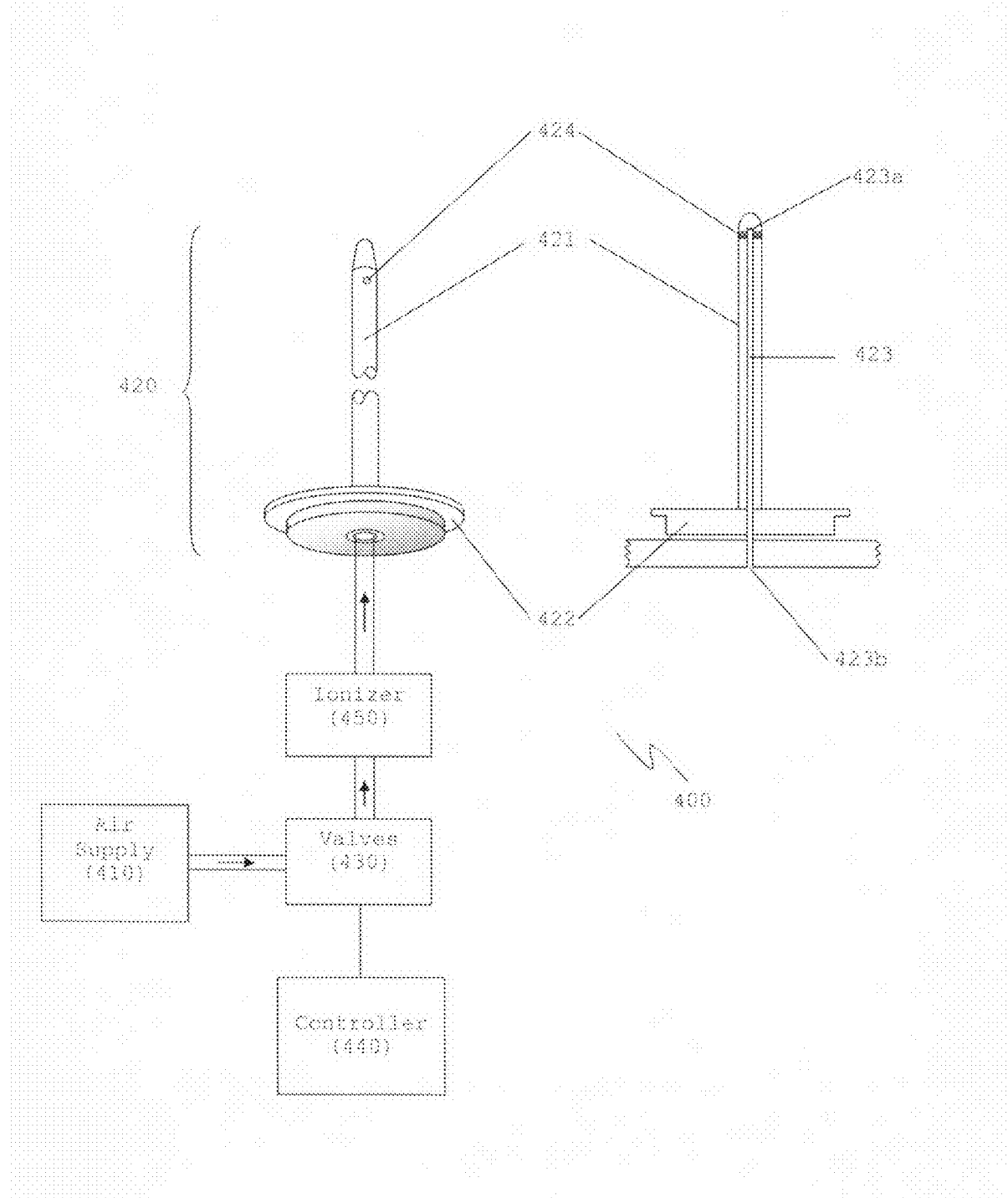
FIG. 4 is a schematic diagram of an apparatus for facilitating the separation and retrieval of the topmost disc stored in a vertical stack of similar discs.

Next, an apparatus for facilitating the separation and retrieval of a topmost disc stored in a vertical stack of similar discs will be discussed below with reference to FIG. 4.

The exemplary apparatus 400 includes an air supply 410 providing pressurized air, a spindle 420, at least one valve 430, and a controller 440 with means to actuate the one or more valves 430.

The spindle 420 has an air channel 423 within a spindle shaft 421 with a first end 423a and second end 423b along a vertical axis of the spindle shaft 421. The spindle shaft 421 may also have one or more air ports 424 through which air supplied from the air supply 410 through the air channel 423 exits the spindle shaft 421.

The one or more air ports 424 may extend from the air channel 423 to the exterior surface of the spindle shaft 421 in a direction perpendicular to a vertical axis of the spindle shaft 421. Thus, the supplied air can exit the said one or more air ports 424 towards the discs in the stack in a radially outward direction.

The air exiting the air ports 424 is preferably ionized and delivered at such a pressure that either the ionized air and/or the air pressure is adequate to neutralize the adhesive tendencies and/or static properties between the topmost disc and the disc immediately below.

The air delivered by the air supply 410 is understood to be any gas that can be ionized by an ionizer 450 that can be part of the air supply 410 or be positioned appropriately at any point along the path of the air flow.

The flow of air directed through the air channel 423 and exiting through the one or more air ports 424 is controlled by one or more valves 430. The one or more valves 430 can be situated at one or more points along the path of air flow between the air supply 410 and the one or more air ports 424.

The controller 440 can be configured to actuate the one or more valves 430 in such a way that the timing of the application of the air flow is controlled so that the topmost disc is separated from the disc immediately below at an optimal timing. The apparatus 400 can further be configured to operate in conjunction with a handling device (to separate the topmost disc) that may or may not already be part of the production line. As an example, the controller 440 can actuate the one or more valves 430 to allow a brief flow of air shortly before a handling device (that can include a picker and a robotic arm) attempts to separate and retrieve the topmost disc from the spindle stack.

The exemplary apparatus 400 is also configured to hold discs with center holes having a diameter slightly larger than the outer diameter of the spindle shaft 421 such that the spindle shaft 421 can penetrate through the center holes. Furthermore, the apparatus 400 can include a base 422 coupled to the spindle shaft 421, with the base 422 being configured to mechanically connect to disc-handling production stations (such as printing or packaging stations) like those described above.

Figure 5:
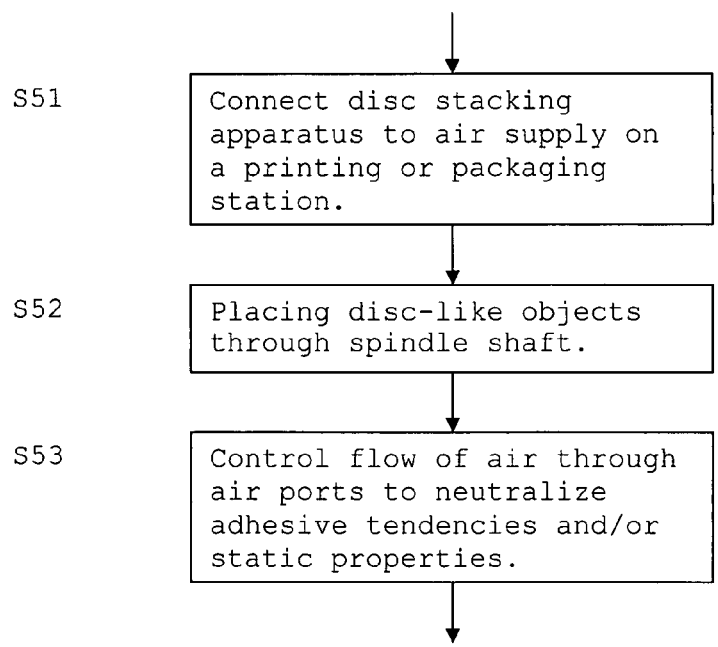
FIG. 5 is a block diagram illustrating a method for facilitating separation and retrieval of a top-most disc-like object from a stack of such objects in accordance with the present disclosure.

Next, a method for facilitating separation and retrieval of a topmost disc-like object from a stack of such objects in accordance with the present application will be discussed with reference to FIGS. 4 and 5.

The process begins (Step S51) with connecting the apparatus described in the second exemplary embodiment of this disclosure, having an air channel 423 and one or more air ports 424 to an air supply 410 on a printing or packaging station. A stack of two or more disc-like objects are then placed (Step S52) through spindle shaft 421. Finally, the air supply 410 is controlled to eject (Step S53) air through the air ports 424 of the spindle 410 to neutralize the adhesive tendencies and/or static properties between the topmost disc and the disc immediately below.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A disc stacking apparatus for holding a vertical stack of discs and being configured to facilitate the separation and retrieval of a topmost disc, said apparatus comprising:
    a base; and
    a spindle shaft coupled to the base, said spindle shaft having
        an air channel within said spindle shaft, and
        one or more air ports configured to facilitate the separation of the topmost disc,
    wherein said air channel has first and second ends, and said first end is closer to said base,
    wherein said one or more air ports are located towards said second end of the air channel,
    wherein air from an air source is supplied through said first end of said air channel, and said supplied air exits said spindle shaft through said air ports in a radially outward direction,
    wherein the discs, including the topmost disc, are optical recording discs having pits and lands,
    wherein said spindle shaft has an outer diameter that is slightly smaller than an inner diameter of a center hole of each of said discs in said vertical stack of discs, and
    wherein said spindle shaft penetrates said center holes to hold said vertical stack of discs.

2. The apparatus of claim 1, wherein said air exiting through the air ports is ionized.

3. The apparatus of claim 1, wherein said apparatus is mechanically connected to a printing or packaging line.

4. The apparatus of claim 1, wherein said each of said discs in the stack has a center hole having a diameter slightly larger than the outer diameter of said spindle shaft, to enable said spindle shaft to penetrate through said center hole.

5. The apparatus of claim 1, wherein the one or more air ports extends from the air channel to the exterior surface of said spindle shaft in a direction perpendicular to a vertical axis of the spindle shaft.

6. The apparatus of claim 1, wherein the air exits said air ports of said spindle shaft in a direction that is parallel to the bottom surface of the topmost disc in the stack and is radially outward relative to a center hole of the disc.

7. An apparatus for facilitating the separation and retrieval of a topmost disc stored in a vertical stack of similar discs, said apparatus comprising:
    an air supply providing pressurized air;
    a spindle shaft having an air channel with first and second ends along a vertical axis of said spindle shaft, said first end being coupled to said air supply, said spindle shaft having one or more air ports through which air supplied through said air channel exits said spindle shaft in a radially outward direction;
    at least one valve for controlling the air flow through said air ports; and
    a controller with means to actuate the valves to control the air flow, wherein the discs, including the topmost disc, are optical recording discs having pits and lands, wherein said spindle shaft has an outer diameter that is slightly smaller than an inner diameter of a center hole of each of said discs in said vertical stack of discs, and wherein said spindle shaft penetrates said center holes to hold said vertical stack of discs.

8. The apparatus of claim 7, wherein the air exiting the air ports is ionized.

9. The apparatus of claim 8, wherein the ionized air exiting the air ports and flowing towards the discs neutralizes static on or between the discs.

10. The apparatus of claim 7, wherein the air exits the air ports towards the discs in a radially outward direction.

11. The apparatus of claim 7, wherein the apparatus operates in conjunction with a handling device to separate the topmost disc from a remainder of the stack.

12. The apparatus of claim 7, further comprising a base coupled to the spindle shaft, and said base is mechanically connected to a printing or packaging line.

13. The apparatus of claim 7, wherein the one or more air ports extends from the air channel to the exterior surface of said spindle shaft in a direction perpendicular to a vertical axis of the spindle shaft.

14. The apparatus of claim 7, wherein each of said discs in the stack has a center hole having a diameter slightly larger than the outer diameter of said spindle shaft, to enable said spindle shaft to penetrate through said center hole.

15. A method for facilitating separation and retrieval of a topmost disc from a stack of discs, said method comprising:

connecting to an air supply on a printing or packaging line a spindle coupled to a base on which the discs are to be stacked and having an air channel and one or more air ports located towards an opposite end of the air channel from the base;

placing a stack of two or more discs on said spindle; and controlling said air source to eject air through said air ports of said spindle in a radially outward direction, to overcome adhesion of the discs, wherein the discs, including the topmost disc, are optical recording discs having pits and lands.

16. The apparatus of claim 1 wherein the air channel does not have ports at locations other than towards the second end of the air channel.

17. The apparatus of claim 7 further comprising a handling device configured to retrieve the topmost disc and wherein the controller is configured to control the at least one valve to allow a brief flow of air to exit through said air ports shortly before the handling device retrieves the topmost disc.

* * * * *